C. E. L. HOLMES.

HINGES.

No. 7,439. Reissued Dec. 19, 1876.

Attest:
Fred Benjamin.
H. C. Robinson

C. E. L. Holmes
By his attorney
Charles E. Foster

THE GRAPHIC CO. N.Y.

UNITED STATES PATENT OFFICE.

CHARLES E. L. HOLMES, OF NEW YORK, N. Y.

IMPROVEMENT IN HINGES.

Specification forming part of Letters Patent No. 183,459, dated October 17, 1876; reissue No. 7,439, dated December 19, 1876; application filed November 13, 1876.

*To all whom it may concern:*

Be it known that I, C. E. L. HOLMES, of the city, county, and State of New York, have invented an Improved Hinge, of which the following is a specification:

The object of my invention is a hinge composed of jointed leaves of compound metal, having zinc for the base, which material, while insuring the requisite strength and stiffness, also secures a surface capable of a high polish and ready ornamentation.

In the manufacture of hinges for inside work, where a brilliant and durable polish is required, it has heretofore been necessary to electroplate ordinary brass or iron hinges. In such cases the color is soon altered by the atmosphere or the action of gases, and when the plating is worn the color of the inferior metal constituting the base of the hinge is shown.

Figure 1:
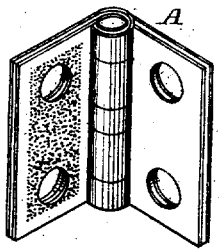

By making a hinge, A, Fig. 1, of a compound metal, consisting of a zinc base and one or more layers of a different metal permanently united thereto, I am enabled to produce an article free from the defects specified, and possessing important advantages, both as a product and in the course of manufacture.

While different metals may be employed in the manufacture, I have found that the union of zinc and tin, or a tin compound is most desirable, on account of the readiness with which the two metals unite, of the fact that the zinc is of the same color as tin, (the wearing away of which does not expose a perceptibly different surface,) and of the ease and consequent cheapness with which the hinges may be made.

Figure 2:
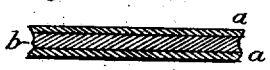

When tin or tin compound forms the outer face, the compound metal may be first made in sheets by applying a sheet of block-tin, *a*, or tin compound, to one or both sides of a sheet or block of zinc, *b*, Fig. 2, and permanently uniting the pieces in one sheet, which is then cut into blanks, formed into leaves, and joined in the usual manner. Embossing may be performed on the leaves after being cut from the sheet.

The zinc is much cheaper than brass, and easier worked than iron, while the adhering metal is capable of receiving a fine and durable polish, (which could not be imparted to the zinc,) maintains its color unimpaired by the action of the air or gases, and is easily susceptible of delicate impressions. For these reasons I find the zinc and tin sheet in most cases best to be adapted to accomplish the object of my invention.

I do not claim the simple plating of zinc hinges by plating applied directly to the zinc after the hinge is made, as it is common to plate hinges made of base metals; neither do I claim as new the compound sheet of zinc and tin; but

I claim as a new article of manufacture—

1. A hinge made from a previously-formed compound sheet of metal, consisting of block-tin, or alloy composed chiefly of tin, and a sheet or backing of zinc, substantially as specified.

2. A hinge the leaves of which consist of two or more metals united permanently at their faces, zinc constituting the base or larger part, substantially as specified.

In testimony whereof I have signed my name to this specification in the presence of two subscribing witnesses.

C. E. L. HOLMES.

Witnesses:
F. D. BAKER,
WM. E. LANSNER.